(12) United States Patent
Srivastava et al.

(10) Patent No.: US 9,946,133 B2
(45) Date of Patent: Apr. 17, 2018

(54) FIELD SEQUENTIAL COLOR FERROELECTRIC LIQUID CRYSTAL DISPLAY CELL

(71) Applicant: The Hong Kong University of Science and Technology, Hong Kong (CN)

(72) Inventors: Abhishek Kumar Srivastava, Lucknow (IN); Vladimir Grigorievich Chigrinov, Hong Kong (CN); Hoi Sing Kwok, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 15/066,227

(22) Filed: Mar. 10, 2016

(65) Prior Publication Data

US 2016/0187691 A1    Jun. 30, 2016

Related U.S. Application Data

(63) Continuation-in-part of application No. 14/070,149, filed on Nov. 1, 2013, now Pat. No. 9,366,934.

(60) Provisional application No. 61/796,034, filed on Nov. 1, 2012, provisional application No. 62/177,243, filed on Mar. 10, 2015.

(51) Int. Cl.
| | |
|---|---|
| *G02F 1/139* | (2006.01) |
| *G09G 3/36* | (2006.01) |
| *G02F 1/1335* | (2006.01) |
| *G02F 1/1337* | (2006.01) |
| *G02F 1/141* | (2006.01) |

(Continued)

(52) U.S. Cl.
CPC .......... *G02F 1/1396* (2013.01); *G02F 1/1337* (2013.01); *G02F 1/13306* (2013.01); *G02F 1/13781* (2013.01); *G02F 1/133528* (2013.01); *G02F 1/141* (2013.01); *G09G 3/36* (2013.01); *G02F 2001/133622* (2013.01); *G09G 2300/0404* (2013.01); *G09G 2310/0235* (2013.01)

(58) Field of Classification Search
CPC . G09G 2310/0235; G09G 3/36; G02F 1/1396
See application file for complete search history.

(56) References Cited

U.S. PATENT DOCUMENTS

| | | | |
|---|---|---|---|
| 5,617,229 A | 4/1997 | Yamamoto et al. | |
| 5,642,129 A | 6/1997 | Zavracky et al. | |

(Continued)

OTHER PUBLICATIONS

U.S. Appl. No. 14/070,149, filed Nov. 1, 2013.

(Continued)

*Primary Examiner* — Kent Chang
*Assistant Examiner* — Scott Au
(74) *Attorney, Agent, or Firm* — Leydig, Voit & Mayer, Ltd.

(57) ABSTRACT

An electrically suppressed helix (ESH) ferroelectric liquid crystal (FLC) display cell with fast response includes: a liquid crystal layer, disposed between two transparent substrates, wherein helix pitch of chiral smectic liquid crystals of the liquid crystal layer is less than the thickness of the liquid crystal layer; at least one polarizer; and a voltage source, configured to apply electrical driving voltage pulses to electrodes of the display cell with amplitude greater than a critical voltage for helix unwinding of the chiral smectic liquid crystals.

13 Claims, 13 Drawing Sheets

(51) Int. Cl.
    *G02F 1/137*     (2006.01)
    *G02F 1/133*     (2006.01)

(56) References Cited

U.S. PATENT DOCUMENTS

| | | | |
|---|---|---|---|
| 5,753,139 | A | 5/1998 | Wand et al. |
| 5,847,799 | A * | 12/1998 | Tanaka ............... G02F 1/141 349/100 |
| 6,069,598 | A | 5/2000 | Hansen |
| 6,535,196 | B2 | 3/2003 | Walker et al. |
| 6,674,504 | B1 | 1/2004 | Li et al. |
| 6,844,909 | B2 | 1/2005 | Wang et al. |
| 6,911,963 | B2 | 6/2005 | Baba et al. |
| 7,864,152 | B2 | 1/2011 | Park et al. |
| 8,184,087 | B2 | 5/2012 | Lin et al. |
| 2002/0075445 | A1 * | 6/2002 | Dabrowski ........ C09K 19/0216 349/174 |
| 2002/0122019 | A1 | 9/2002 | Baba et al. |
| 2003/0174112 | A1 * | 9/2003 | Jones ............... G09G 3/3629 345/94 |
| 2004/0041975 | A1 * | 3/2004 | Yoshihara .......... G02F 1/141 349/172 |
| 2008/0106689 | A1 | 5/2008 | Inoue et al. |
| 2009/0161042 | A1 | 6/2009 | Inoue et al. |
| 2011/0141424 | A1 | 6/2011 | Lee et al. |
| 2011/0285928 | A1 | 11/2011 | Chigrinov et al. |
| 2011/0298767 | A1 * | 12/2011 | O'Callaghan ....... G02F 1/1337 345/208 |

OTHER PUBLICATIONS

Bergquist, et al., "49-2: Field Sequential-Colour Display with Adaptive Gamut", *Journal of the SID*, 2006.
Castles, et al., "Ultra-fast-switching flexoelectric liquid-crystal display with high contrast", *Journal of the SID*, 18(2), 2010.
Kawamoto et al., "Polymer-stabilized V-mode FLCDs and their application to color sequential full color LCDs" *Displays*, 25, 2004, pp. 45-47.
Kobayashi, et al., "Narrow-gap field-sequential TN-LCD with and without nanoparticle doping", *Journal of the SID*, 19(11), 2011.
Pozhidaev et al., "High Frequency Low Voltage Shock-Free Ferroelectric liquid Crystal: A New Electro-Optical Mode with Electrically Suppressed Helix", *SID Conference Record of the International Display Research Conference*, pp. 7-11, 2011.
Srivastava, et al., "Paper No. 6.4: Full Color Field-Sequential Color Display Based on Electrically Suppressed Helix FLC" *EuroDisplay*, 2013.
Srivastava, et al., "Fast switchable grating based on orthogonal photo alignments of ferroelectric liquid crystals", *Applied Physics Letters*, 101, 031112, 2012.
Yan, et al., "High-Efficiency and fast-response tunable phase grating using a blue phase liquid crystal", *Optics Letters*, vol. 36(8), Apr. 15, 2011.
Guo, Qi, et al., "Optimization of Alignment Quality of Ferroelectric Liquid Crystals by Controlling Anchoring Energy", *Applied Physics Express* 7, 021701 (2014), The *Japan Society of Applied Physics*, pp. 021701-1-021701-3.

* cited by examiner

FIELD SEQUENTIAL COLOR FERROELECTRIC LIQUID CRYSTAL DISPLAY CELL

CROSS-REFERENCE TO RELATED APPLICATIONS

This patent application is a continuation-in-part of copending U.S. patent application Ser. No. 14/070,149, filed on Nov. 1, 2013, which claims the benefit of U.S. Provisional Patent Application No. 61/796,034, filed on Nov. 1, 2012. This patent application also claims the benefit of U.S. Provisional Patent Application No. 62/177,243, filed on Mar. 10, 2015. All of the foregoing applications are incorporated by reference herein in their entireties.

FIELD

The present invention relates to a liquid crystal (LC) display. More particularly, the invention relates to a field sequential color (FSC) display based on a ferroelectric liquid crystal display (FLCD) cell with fast response having alignment quality comparable to nematic LCs, the FLCD cell comprising a chiral smectic liquid crystal whose helix pitch is less than the thickness of LC layer.

The present invention further relates to a display cell based on a ferroelectric liquid crystal display (FLCD) cell with fast response having alignment quality comparable to nematic LCs, the FLCD cell comprising FLCs whose helix pitch is less than the thickness of LC layer.

Applications of LC display cells having fast response, high resolution, and high contract include, for example, fast-response photonics devices (e.g., modulators, filters, attenuators) and high-resolution displays (e.g., pico-projector, 3D display, micro-display, HDTV).

BACKGROUND

Conventional displays are designed on basis of spatially "simultaneous additive color mixing process." FSC displays, on the other hand, in which color displaying can be carried out with one pixel, use a "successive additive color mixing process" by a temporally-divided backlight system. FSCDs offer several fundamental advantages over conventional transmissive and emissive displays. The absence of sub-pixels and color filters give high transmission, large aperture ratio, and the possibility of at least three times higher pixel density as well as three times less power consumption. Furthermore, the primary chromaticity is determined solely by the light sources, which enables wider gamut. However, an inherent problem of FSCDs is the presence of saccadic color break-up artifacts. These artifacts may be eliminated only by increasing the frame rate, which requires LCs with fast response time.

Due to fundamental working principle of FSCDs, conventional nematic LCs cannot satisfy the high frequency requirement to avoid color break up. However, a number of other LC-based architectures and electro-optical modes have been proposed for FSCDs to attempt to improve the response time for LCs.

One approach uses the flexoelectric effect of short pitch cholesteric LCs shows a response time of ~200 µs. This technology, however, has several material issues and a very complicated fabrication procedure.

In some alternate approaches, polymer-stabilized blue phase liquid crystal and cholesteric liquid crystal have been proposed with very fast response time (around 1 ms). Drawbacks which limit these technologies are the very high requirement of driving voltage at the electric field of E=20 V/µm and several material issues.

FLCs, because of their fast response times, are another possibility for FSCDs. One approach is a polymer stabilized FLC to enable monostable V-shape switching (hereinafter abbreviated PSV-FLCD). Another approach is a photoaligned fast FLC display using deformed helix ferroelectric (hereinafter abbreviated DHF) mode LC used for FSCDs, for example, as described in U.S. patent application Ser. No. 13/110,680 (published as U.S. Publication No. 2011/0285928), which is incorporated herein by reference in its entirety. The electronic driving scheme for this DHF FLC includes amplitude modulation, which may increase the fabrication expense.

Recently, in-plane switching (IPS), Advanced Super Dimension Switching (ADS), and fringe field switching (FFS) have been used in high-end LCD applications because they provide wide view angle and high resolution. However, such conventional IPS, ADS and FFS devices suffer from severe drawbacks in terms of image-sticking due to residual DC (RDC) of the alignment layer, as well as non-uniformity and loss of light transmittance at the edge of the pixels due to non-uniformity liquid crystal alignment. Image flickering is also an issue with respect to FFS displays, and complex fabrication and manufacturing costs are additional drawbacks as well.

While FLCs, due to their in-plane switching behavior, provide the advantages of fast switching speed and lower power consumption along with simpler and cheaper fabrication. However, due to certain limitations of FLCs (e.g., the geometrical, optical and mechanical defects associated therewith), FLCs have not conventionally been adopted for high-end LCD applications.

SUMMARY

In an exemplary embodiment, an electrically suppressed helix (ESH) ferroelectric liquid crystal (FLC) display cell with fast response includes: a liquid crystal layer, disposed between two transparent substrates, wherein helix pitch of chiral smectic liquid crystals of the liquid crystal layer is less than the thickness of the liquid crystal layer; at least one polarizer; and a voltage source, configured to apply electrical driving voltage pulses to electrodes of the display cell with amplitude greater than a critical voltage for helix unwinding of the chiral smectic liquid crystals.

BRIEF DESCRIPTION OF THE SEVERAL VIEWS OF THE DRAWINGS

The invention will be described in even greater detail below based on the exemplary figures. The invention is not limited to the exemplary embodiments. All features described and/or illustrated herein can be used alone or combined in different combinations in embodiments of the invention. The features and advantages of various embodiments of the invention will become apparent by reading the following detailed description with reference to the attached drawings which illustrate the following.

DETAILED DESCRIPTION

FSC FLC Display Cells

Figure 1A:
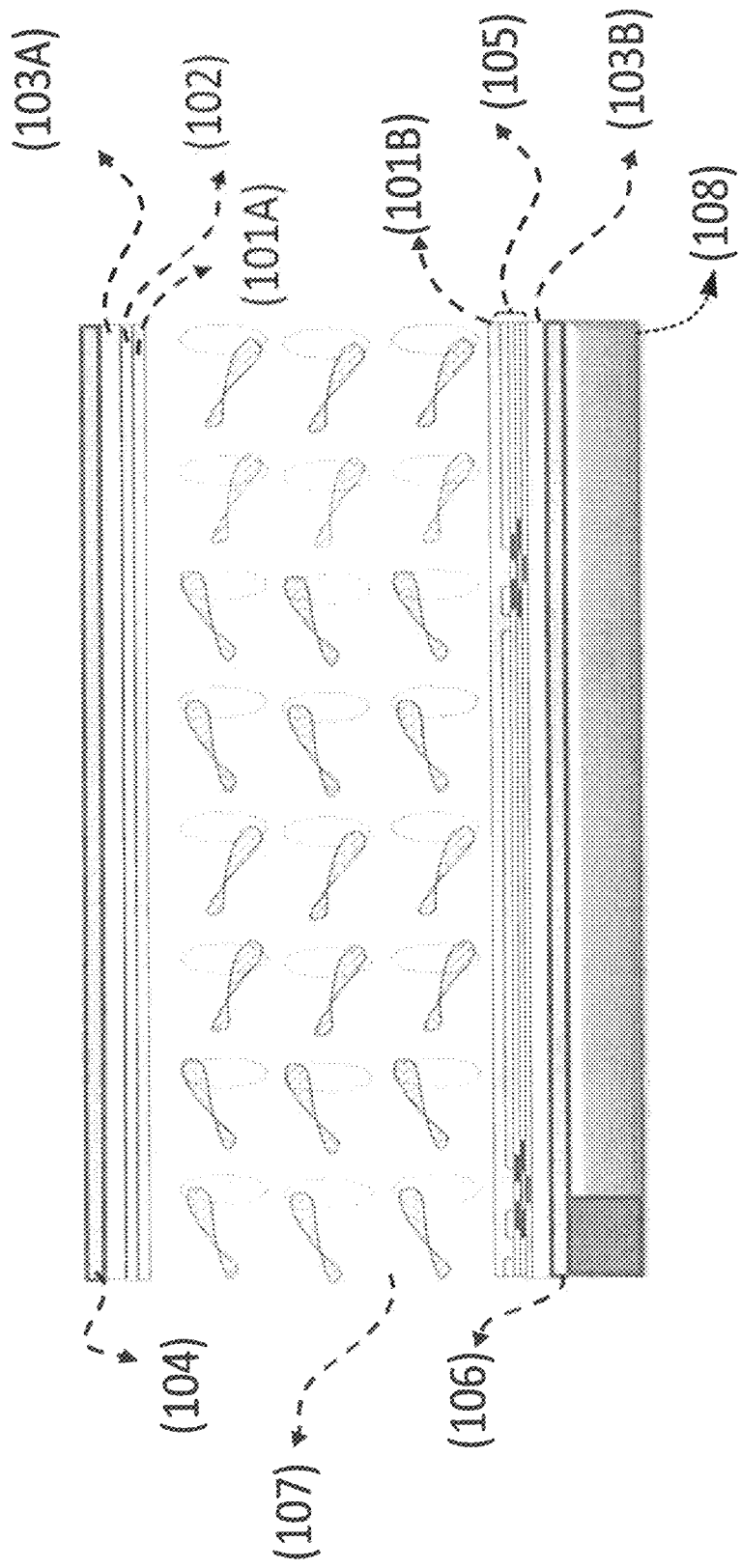
FIG. 1A is a diagram illustrating the components of an FSC FLC display cell in an exemplary embodiment.

Certain embodiments of the invention relate to a field sequential color (FSC) display based on an electrically suppressed helix (ESH) ferroelectric liquid crystal (FLC) display cell structure which exhibits fast response (e.g., less than 10 μs at an applied electric field of 6.67 V/μm), wide viewing angle, high contrast ratio (e.g., 10000:1 at 3.5 volts/μm) and a large color triangle (e.g., more than 130% of the area of a standard NTSC (National Television System Committee) color triangle with respect to CIE 1931 color space at 3.5 volts/μm).

Further, in an exemplary embodiment, an FLC FSCD was able to achieve a frame frequency of 240 Hz, as well as 24-bit color (by changing the residual light of the cell to generate 8-bit gray levels in each of three subframes). Additionally, the FSC display exhibited saturated electro-optical modulation up to a frequency of 5 kHz under an applied electric field of 5 volts/μm.

ESH mode is another electro-optical mode of an FLC cell. An ESH FLC cell, in an embodiment of the invention, comprises FLCs with helix pitch less than the thickness of the LC layer, which thereby provides a defect-free layer of FLCs under an applied electric field higher than the critical electric field threshold for helix unwinding. The FLC layer is configured such that the helix elastic energy is slightly higher than the effective anchoring energy of the alignment layer (e.g., about 1 to 3 times the anchoring energy), allowing for the ESH electro-optical mode to be achieved in an FLC cell. The ESH FLC cell has an extremely fast response, and has alignment quality on the same level as nematic LCs. The ESH FLC cell is placed between two polarizers, and is connected to a source of electrical driving voltage that provides the applied electric field via electrodes. The ESH FLC cell provides high contrast, small response time at very high frequency, and very low power consumption.

There are several differences between an ESH FLC cell and a DHF FLC cell. An FLC cell to be operated in DHF mode requires a tilt angle close to 45° and spontaneous polarization of more than 150 nC/cm$^2$, whereas for an ESH FLC cell the tilt angle should be around 22.5° and the spontaneous polarization should be more than around 50 nC/cm$^2$. Furthermore, the helix of FLCs in an ESH FLC cell should be sufficiently large but while being smaller than the cell gap to provide balance between elastic and anchoring energy of the system (e.g., 2 to 5 times smaller than the cell gap). As noted above, for an ESH FLC cell, the elastic energy of the helix must be comparable to but larger than the anchoring energy of the alignment (e.g., about 1 to 3 times the anchoring energy).

Additionally, the driving scheme for an ESH FLC cell is entirely different from a DHF FLC cell. The ESH FLC cell is a mono stable FLC cell having only two states (bright or dark) and thus uses a pulse width modulation driving scheme to generate gray scales (an amplitude modulation scheme would not be able to generate gray scales with respect to an ESH FLC cell), whereas a DHF FLC cell uses an amplitude modulation scheme in order to generate different brightness to achieve grayscale.

An exemplary overall architecture for an FSC display including an FLC cell and light emitting diodes (LEDs) to illuminate pixels in a time-sequential manner is depicted in FIG. 1A. The FSC display includes polarizers 104 and 106, substrates 103A and 103B, an ITO conductive layer 102, alignment layers 101A and 101B, a thin film transistor array 105 for providing a driving voltage, light emitting diode (LED) backlighting 108, and FLC layer 107.

Figure 1B:
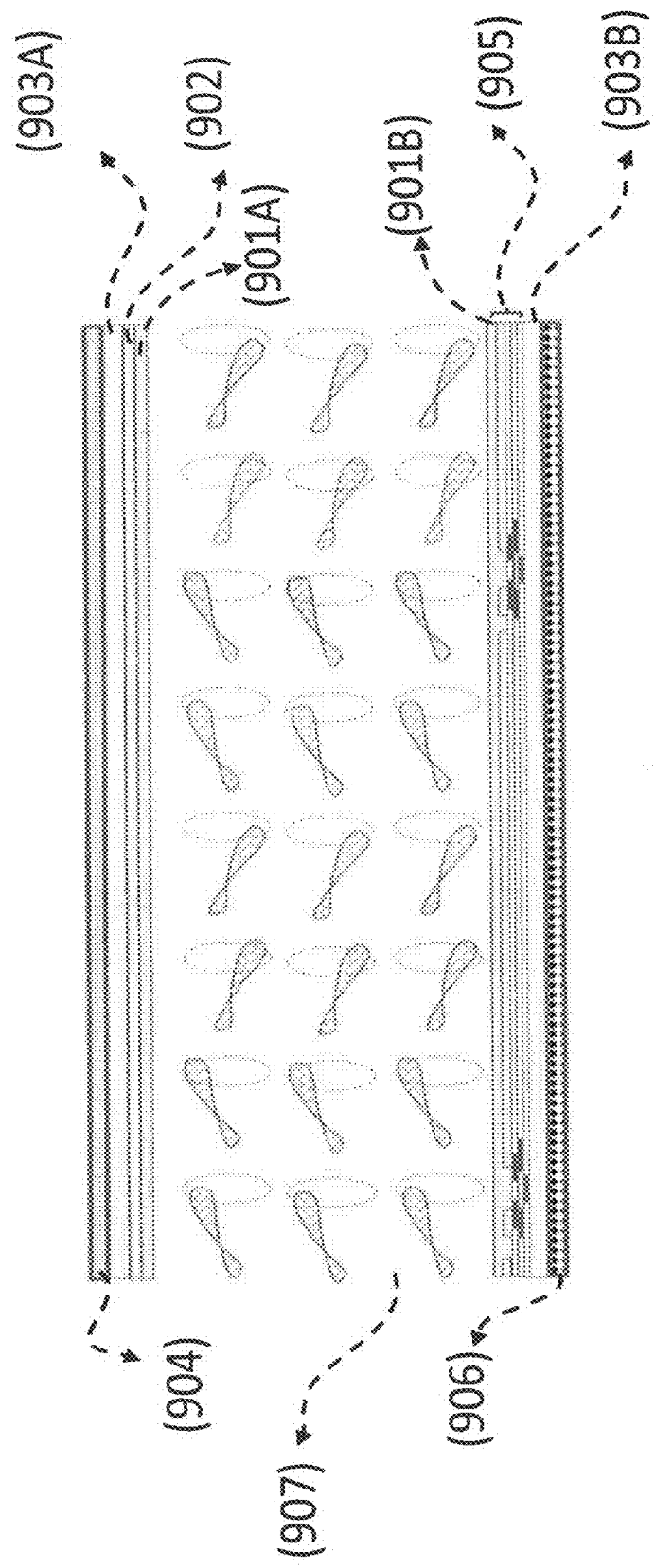
FIG. 1B is a diagram illustrating the components of an FSC FLC display cell in another exemplary embodiment.

An alternative exemplary overall architecture for an FSC display including a reflective FLC cell is depicted in FIG. 1B. The reflective FLC cell includes a polarizer 904, substrates 903A and 903B, an ITO conductive layer 902, alignment layers 901A and 901B, a thin film transistor array 905 for providing a driving voltage, a reflective mirror layer 906, and FLC layer 907. It will be appreciated that in this exemplary overall architecture, LED backlighting is not used.

It will be appreciated that in FIGS. 1A and 1B, the substrates may comprise glass and/or plastic material, and that the alignment layers may be prepared by photoalignment, rubbing, and/or oblique evaporation (and with precise control of the corresponding anchoring energy).

Figure 2:
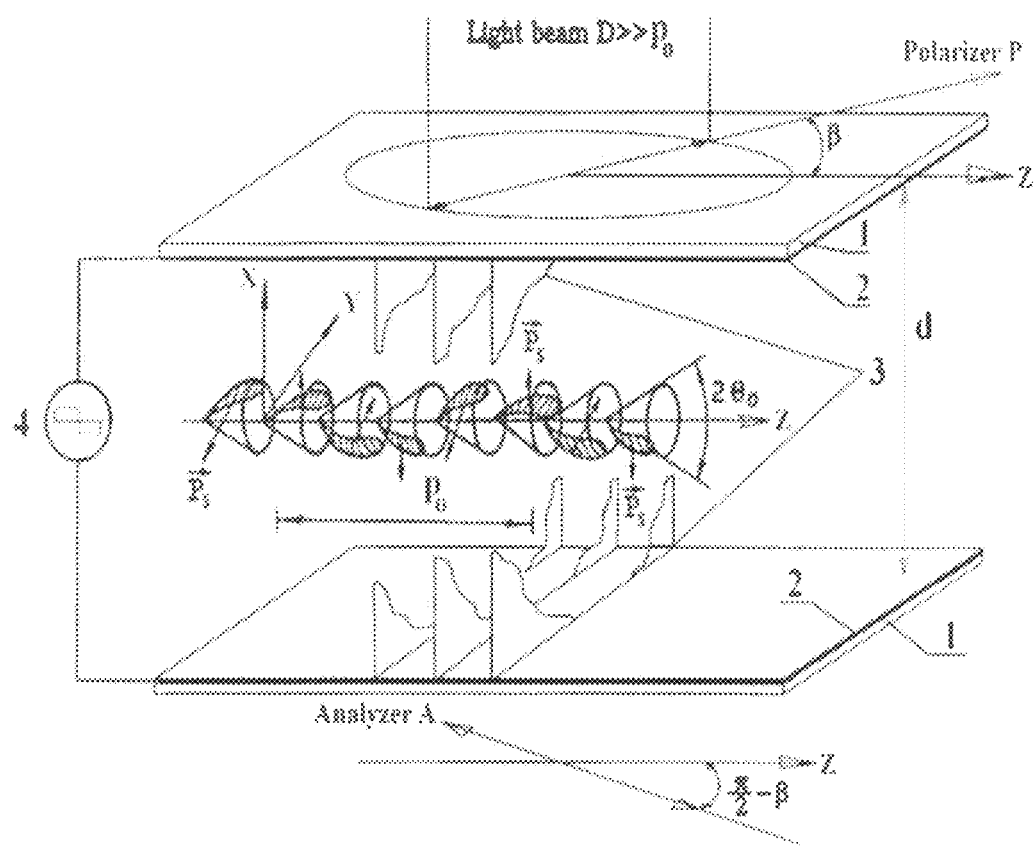
FIG. 2 is a diagram illustrating liquid crystal structure in an exemplary embodiment.

Exemplary embodiments of the invention will be discussed with further detail with respect to FIGS. 2-7. FIG. 2 depicts a diagram that illustrates a chiral liquid crystal layer representing a ferroelectric liquid crystal of chiral smectic C* phase whose helical structure has a pitch $P_0$ smaller than a gap d between the first and the second substrates of an FLC display cell. Given an FLC layer thickness d greater than helical pitch $P_0$, and with an applied voltage V that is greater than the critical voltage for helix unwinding (hereinafter abbreviated $V_c$)—i.e. $V > V_c$—the FLC display cell is in the ESH electro-optical mode.

Element 1 corresponds to substrates, which are transparent with respect to visible light. Element 2 corresponds to conductive layers, which are transparent with respect to visible light and covered by an aligning layer. Element 3 corresponds to smectic layers, which are perpendicular to the substrates. Element 4 corresponds to a source of driving voltage applied to the conductive layers 2.

β corresponds to an angle between polarizer plane and the helix axes in the absence of an applied voltage. D corresponds to light beam aperture, which is considerably larger (e.g., at least approximately 10-20 times larger) than the helix pitch. An XYZ coordinate system is also depicted for reference purposes. The Z-axis is aligned along the helix axes and the principle optical axes of the liquid crystal layer. The X-axis is perpendicular to the substrates, and the Y-axis is parallel to the substrates.

Figure 3:
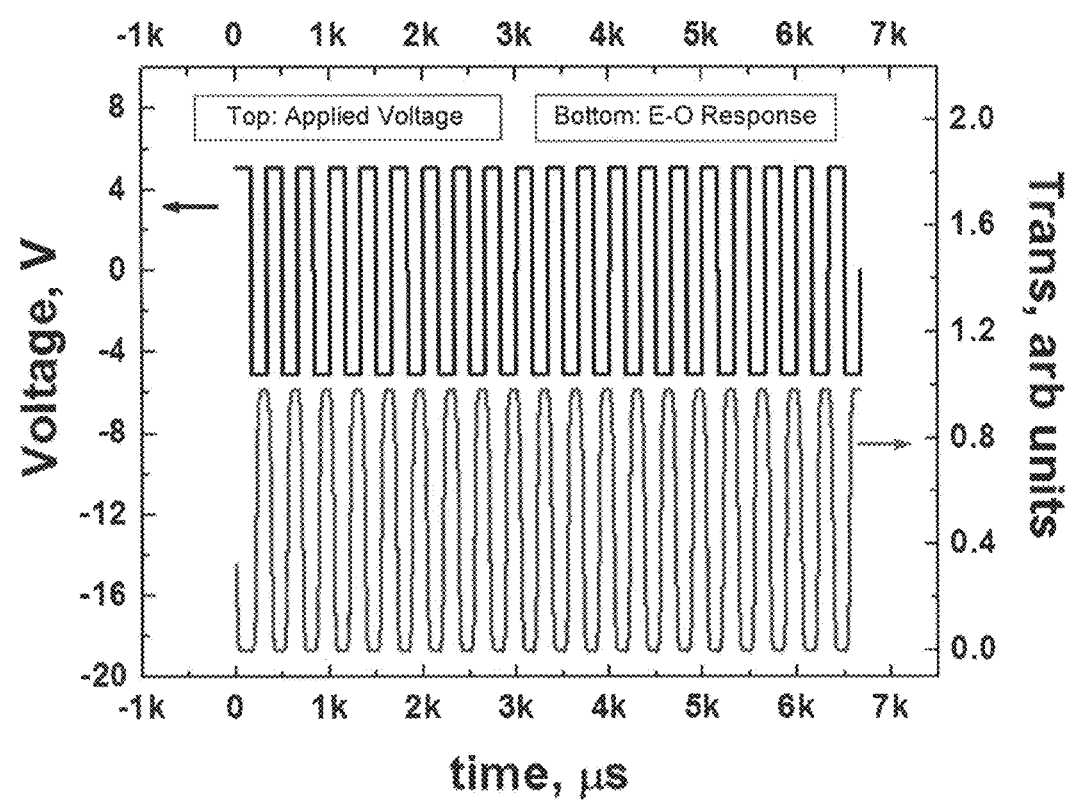
FIG. 3 is a graph illustrating an electro-optical response of an ESH FLC display cell in an exemplary embodiment.

FIG. 3 depicts a graph illustrating the electro-optical response of an ESH FLC display cell in an exemplary embodiment. The top waveform corresponds to an applied voltage (left-side axis) over time. The bottom waveform corresponds to electro-optical response of the ESH FLC display cell (right-side axis) over time. The operating conditions to obtain this waveform included: temperature (T)=22° C., wavelength ($\lambda$)=0.63 m, and operational frequency (f) of 3 kHz. As can be seen from FIG. 3, ESH electro-optical mode provides for very fast electro-optical response time and allows for high frequency electro-optical modulation.

Additionally, an embodiment of the ESH FLC display cell was able to manifest electro-optical modulation with saturated bright and dark states up to the applied voltage frequency of 5 kHz at the electric field of 5 V/µm. With this high operation frequency of 5 kHz, the frame rate of 240 Hz for field sequential color display can be achieved. And, by using light emitting diodes (LEDs) to illuminate pixels sequentially in time pursuant to pulse-width modulation, the residual light of the cell can be adjusted to generate different colors and levels of grayscale.

Figure 4:
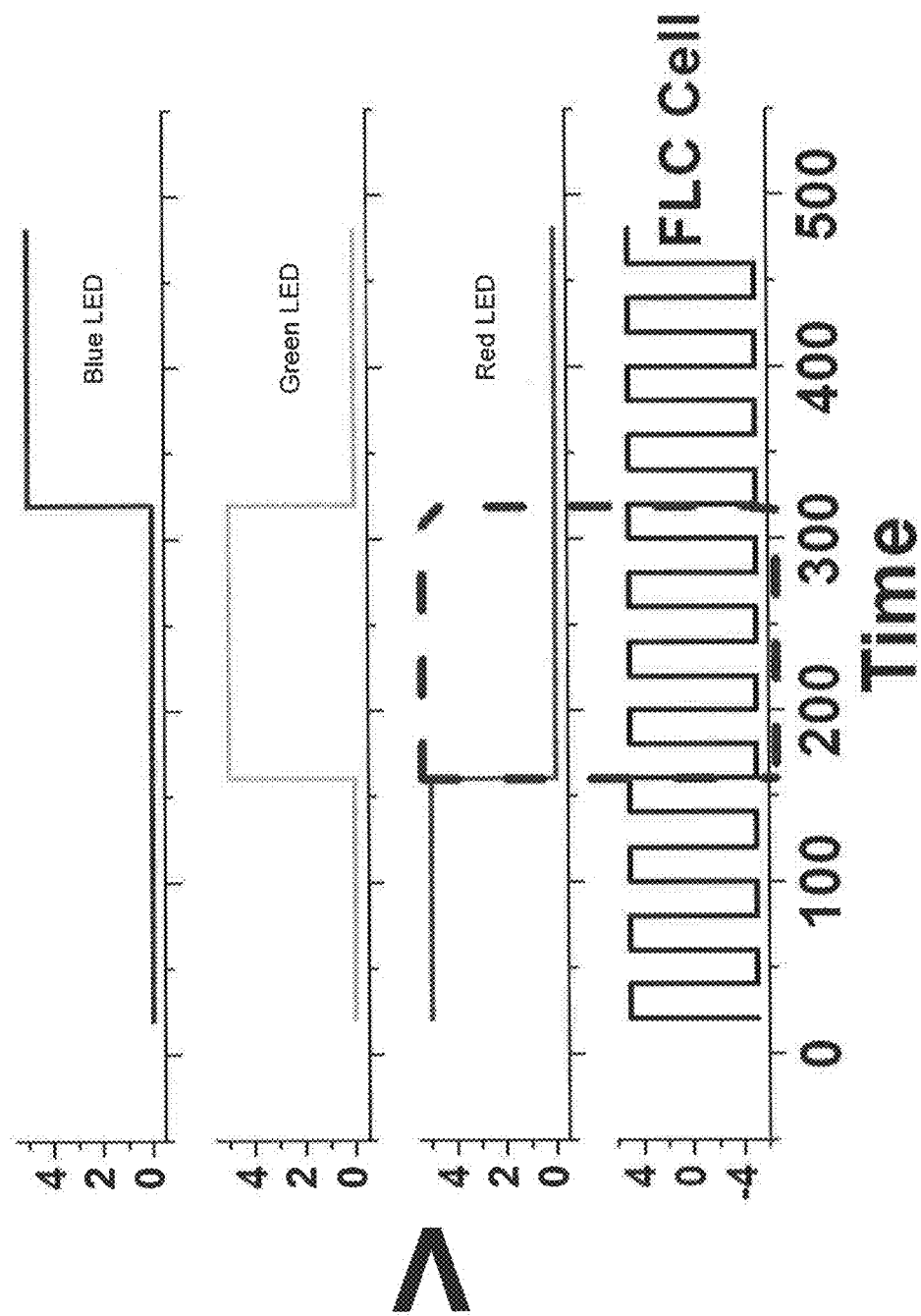
FIG. 4 contains graphs illustrating a driving scheme for an ESH FLC FSC display cell in an exemplary embodiment.

FIG. 4 depicts graphs illustrating a driving scheme for an ESH FLC FSC display cell. The top three graphs are voltage waveforms applied to blue, green and red LEDs of the display cell, respectively. Based on the application of these voltage waveforms, the three color LEDs are sequentially turned ON and OFF over time. The fourth graph (at the bottom) corresponds to a voltage waveform applied to the ESH FLC cell of the ESH FLC FSC display cell. The dashed square represents coupling of the electro-optical response of the ESHFLC cell with different LEDs' bright states (i.e., during the time period encompassed by the dashed box, the FLC cell is being driven with the red LED off, the blue LED off, and the green LED on).

Thus, as shown by FIG. 4 which represents an example of an "on" frame, 24-bit color is achievable by an ESH FLC FSC display cell in an embodiment (based on RGB sub-frames with 8-bit gray levels, using a pulse width modulation driving scheme where residual light is varied based on variation of the bright time with respect to each subframe to achieve intermediate colors and shades). Accordingly, a total of $2^{24}$ colors can be achieved (over 16 million).

Figure 5:
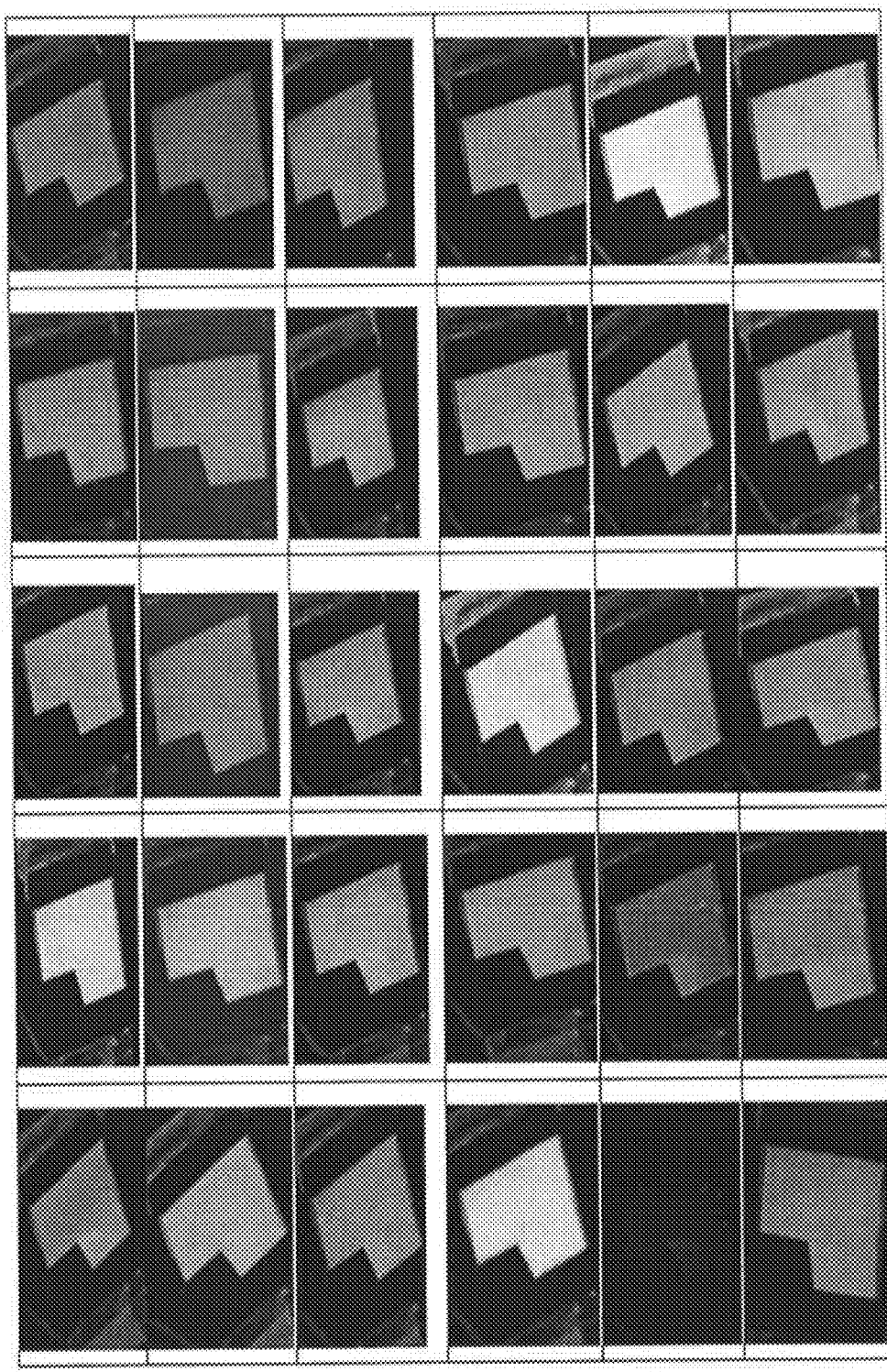
FIG. 5 contains images showing achieved colors (in black & white) having different gray levels using an ESH FLC FSC display cell in an exemplary embodiment.

FIG. 5 depicts a grayscale reproduction of a photograph demonstrating some of the achieved colors with different gray levels. A color reproduction of this image can be found in A. Srivastava et al., "Full Color Field Sequential Color Display Based on Electrically Suppressed Helix FLC", Presentation at LCD-4, EuroDisplay 2013, which is incorporated herein by reference in its entirety.

Figure 6:
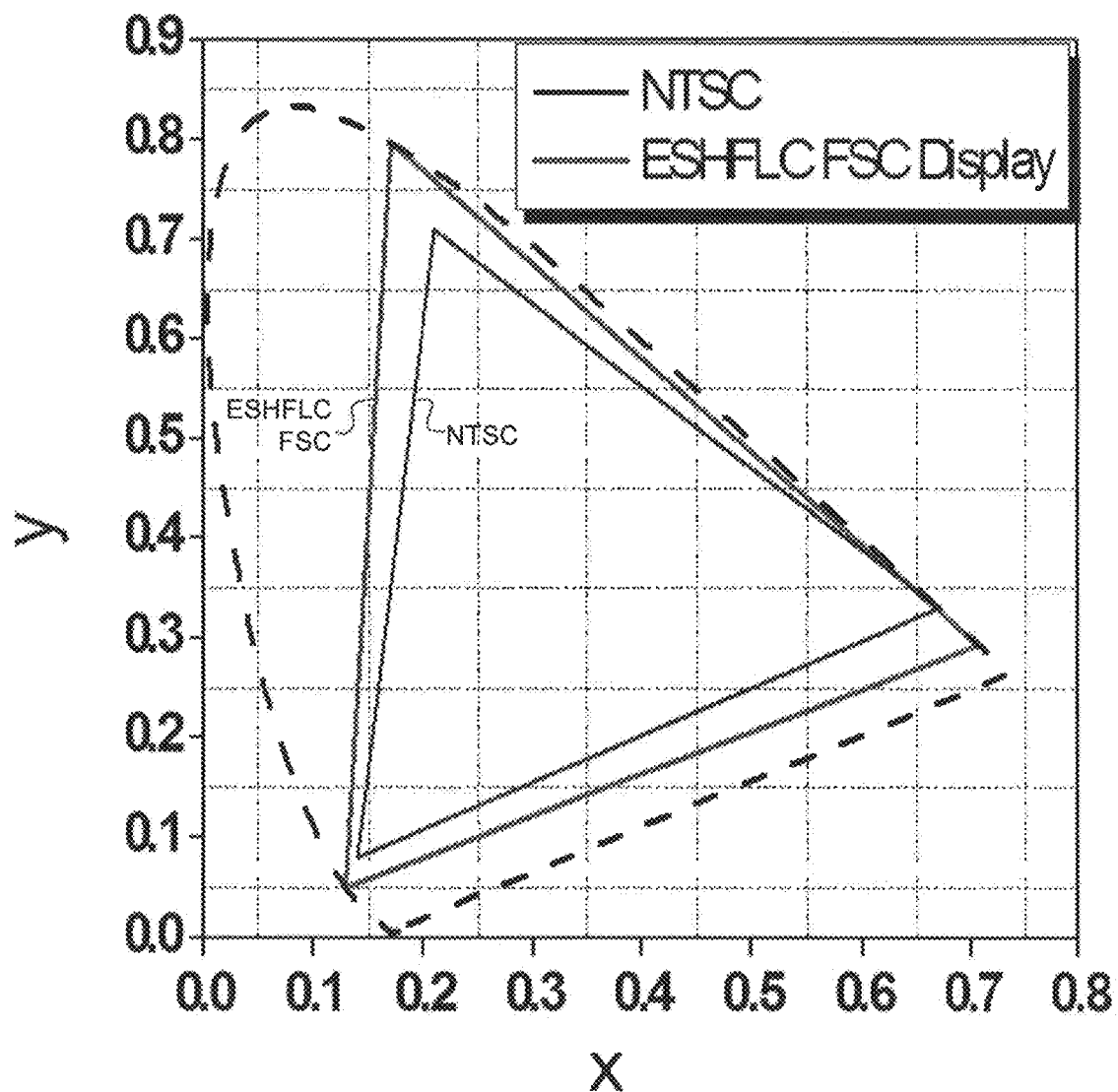
FIG. 6 is a graph illustrating display colors achieved by an ESH FLC FSC display cell in an exemplary embodiment with respect to a CIE 1931 color space.

FIG. 6 is a graph depicting observed ESH FLC FSC display colors as represented with respect to the CIE 1931 color space. The area encompassed by the color triangle corresponding to an ESH FLC FSC display in an embodiment of the invention, which was achieved with an applied electric field of less than 3.5 volts/µm (i.e., 3.33 volts/µm), is about 130% of the area encompassed by the standard NTSC color triangle. It will be appreciated that the large color triangle achieved in this embodiment is based solely on the LEDs and the efficiency of the LEDs, as no color filters are used. Additionally, the ESH FLC FSC display achieves a wide viewing angle (i.e., about 85 degrees from the normal position for each side) due to the utilization of in-plane switching.

Figure 7:
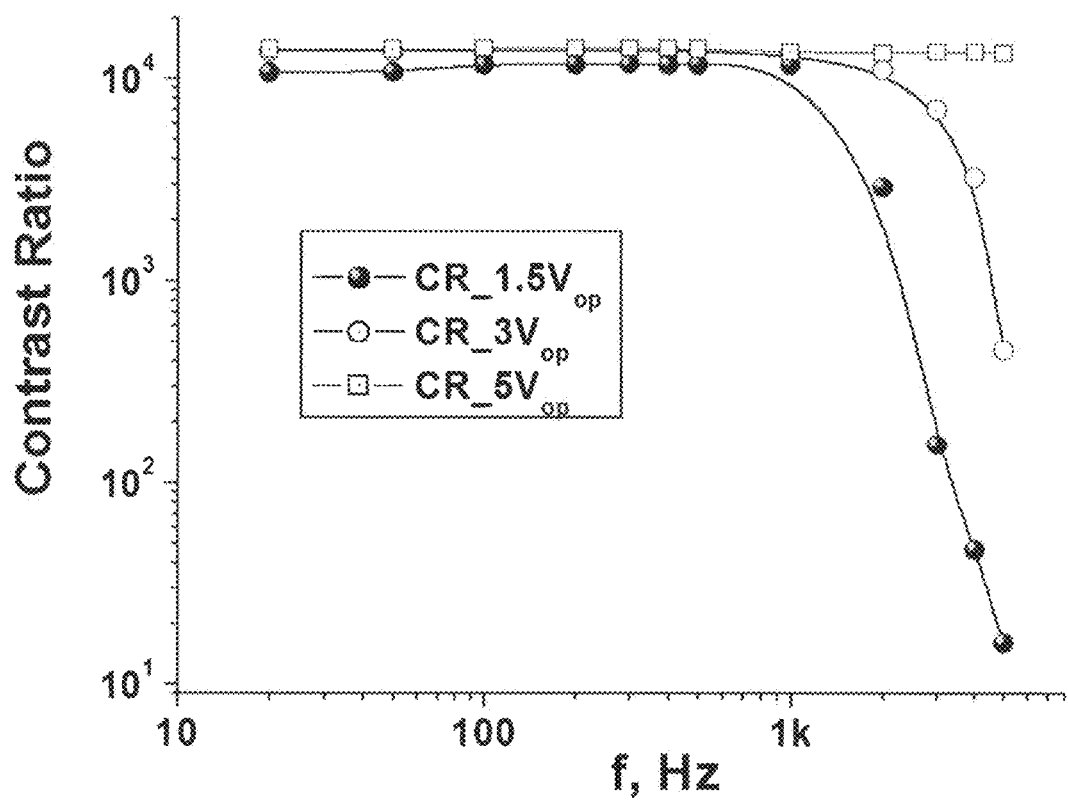
FIG. 7 is a graph illustrating contrast ratio dependency on driving voltage frequency of an ESH FLC FSC display cell in an exemplary embodiment.

FIG. 7 depicts a graph illustrating dependency of the contrast ratio of an ESH FLC FSC display cell on driving voltage frequency at an applied electric field of 1.5 V/µm, 3 V/µm and 5 V/µm. As depicted in FIG. 7, the ESH FLC FSC display cell with d>$P_0$ provides very high contrast ratio up to very high operating voltage frequencies. For example, the contrast achievable with the ESHLC FSC display cell in an embodiment is more than 10000:1 up to a frequency of 5 kHz at an operating voltage of 5 V/µm.

Figure 8:
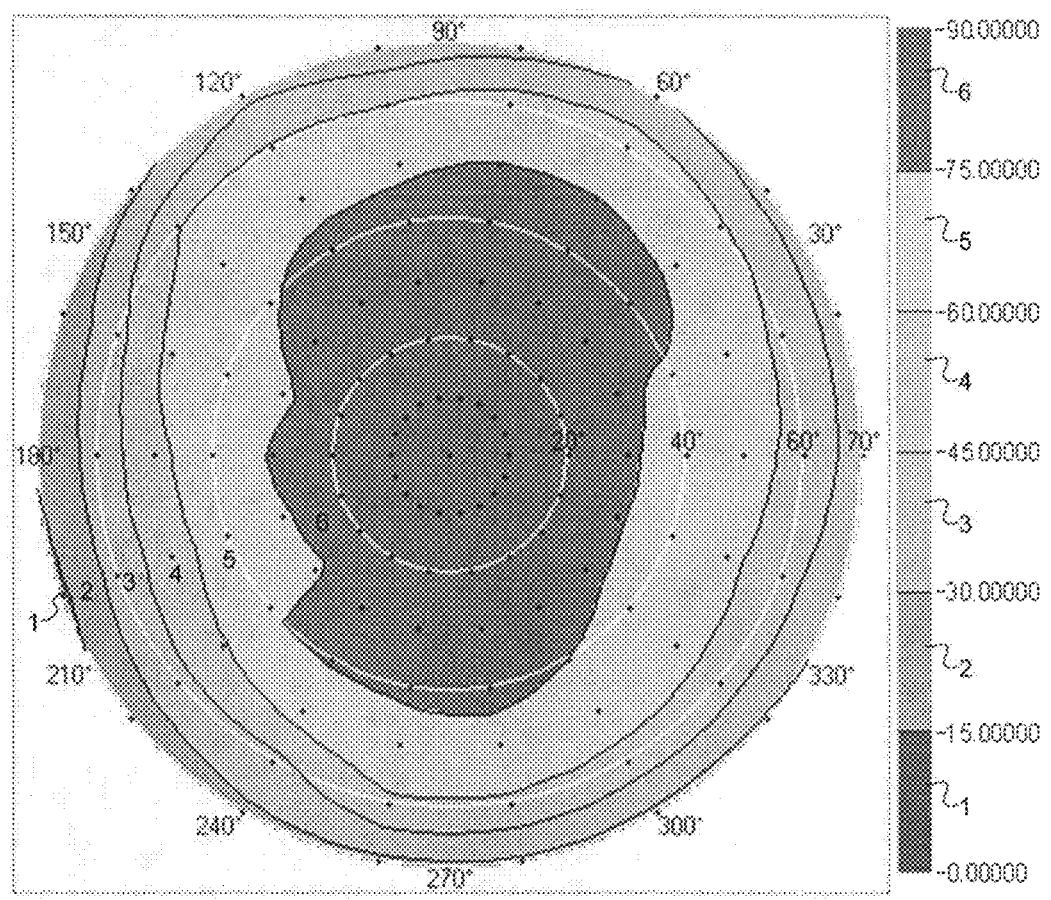
FIG. 8 is a diagram illustrating angular dependence of the transmittance of an ESH FLC FSC display cell in an exemplary embodiment.

FIG. 8 is a diagram illustrating the angular dependence of the transmittance of an ESH FLC FSC display cell. FIG. 8 shows that wide viewing angle is achieved (i.e., about 85 degrees from the normal position for each side). Referring to the "normal position" as being directly in front of the display cell, the transmittance at about 70° from the normal position was demonstrated in an embodiment to be about 60% of its maximum value at the normal position.

Other FLC Display Cell

Other exemplary embodiments of the invention relate to displays (including non-FSC displays) based on an electrically suppressed helix (ESH) ferroelectric liquid crystal (FLC) display cell structure which exhibits fast response (e.g., less than 10 µs at an applied electric field of 6.67 V/µm), wide viewing angle, and high contrast ratio (e.g., 10000:1 at 3.5 volts/µm).

In particular, by using nano-scale photoalignment (i.e., applying a photosensitive alignment layer having a thickness that is in the nanometer range) together with ESH FLC technology, LCD displays having fast electro-optical response, high contrast ratio, wide viewing angle, and relatively low power consumption can be achieved. In exemplary embodiments, a frame frequency of 240 Hz has been demonstrated for an ESH FLC display with more than 8-bit gray levels being generated. Further, the ESH FLC display is characterized by very high optical contrast, small electro-optical response time and saturated electro-optical modulation (at frequencies up to 5 kHz with an applied electric field of 5 V/µm). The ESH FLC display further achieves high contrast (e.g., 10000:1) with wide viewing angle with an applied electric field of 3.5 V/µm.

As discussed above with respect to FIG. 2, an exemplary ESH FLC display cell includes a helical structure of chiral smectic C* phase layer whose thickness d is bigger than the helix pitch $p_0$. The display cell includes substrates, transparent for the visible light (element 1); conductive layers, transparent for the visible light and covered with any aligning layer (element 2); smectic layers, which are perpendicular to the substrates (element 3), and a source of driving voltage (element 4). β is an angle between polarizer plane and the helix axes at the absence of the applied voltage, and D is a light beam aperture, which is considerably bigger than the helix pitch. The Z-axis is aligned along the helix axes and the principle optical axes of the liquid crystal layer, the X-axis is perpendicular to the substrates, and the Y-axis is parallel to the substrates.

Figure 9:
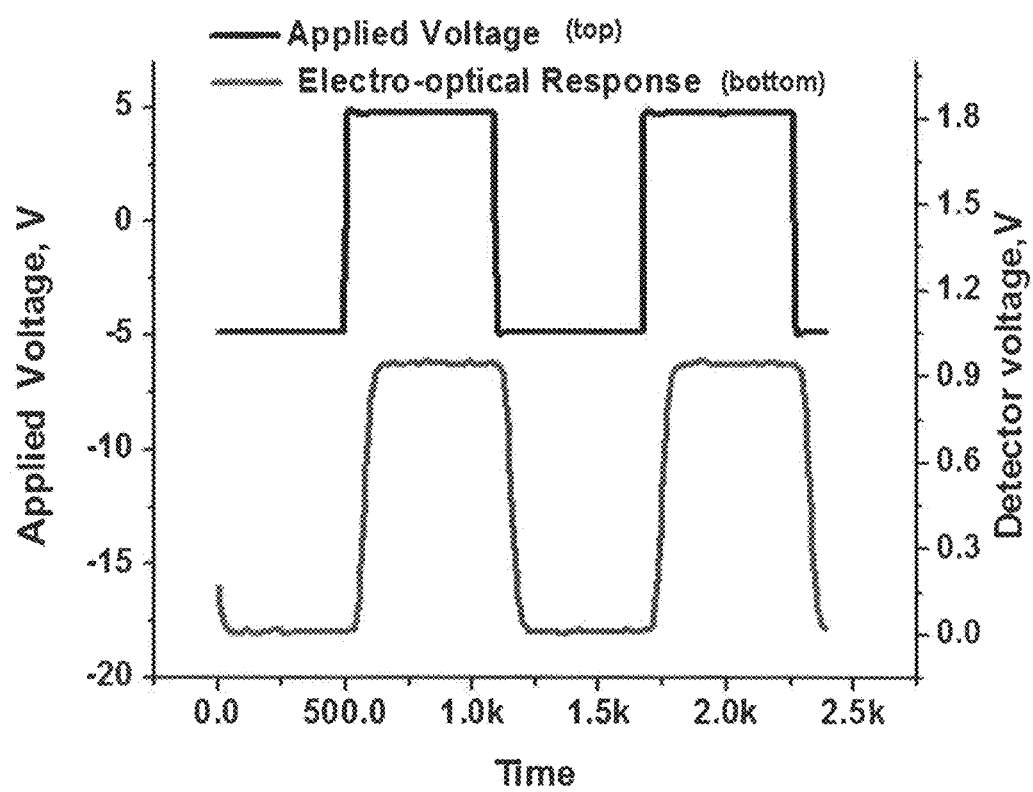
FIG. 9 is a graph illustrating an electro-optical response of an ESH FLC display cell in an exemplary embodiment.

The chiral liquid crystal layer represents a ferroelectric liquid crystal of chiral smectic C* phase whose helical structure has a pitch $P_0$ smaller than a gap d between the first and the second substrates of the cell. For the FLC layer thickness d greater than helical pitch $P_0$ and the applied voltage V is greater than the critical voltage for the helix unwinding (hereinafter abbreviated $V_e$)—i.e. V>$V_c$—ESH electro-optical mode exists. The ESH electro-optical mode manifests very small electro-optical response time and high frequency electro-optical modulation, and the cell manifests electro-optical modulation with saturated bright and dark states up to the applied voltage frequency of 5 kHz at the electric field of 5V/μm. This is depicted in FIG. 9, which shows the electro-optical response of an exemplary ESH FLC display cell, where the top portion of FIG. 9 is the applied voltage and the bottom portion of FIG. 9 represents electro-optical response of the ESH FLC display cell at temperature (T)=22° C., wavelength (λ)=0.63 μm and operational frequency (f) of 1 kHz.

The exemplary ESH FLC display cell is able to generate more than 8 bit gray levels using a driving scheme based on multiple pulse modulations or pulse width modulation. This has been demonstrated with variation of the residual light by varying the bright time of the display cell. The intermediate or different gray scales can be generated by simple variation in the bright time of the ESH FLC display cell for different purposes.

Figure 10:
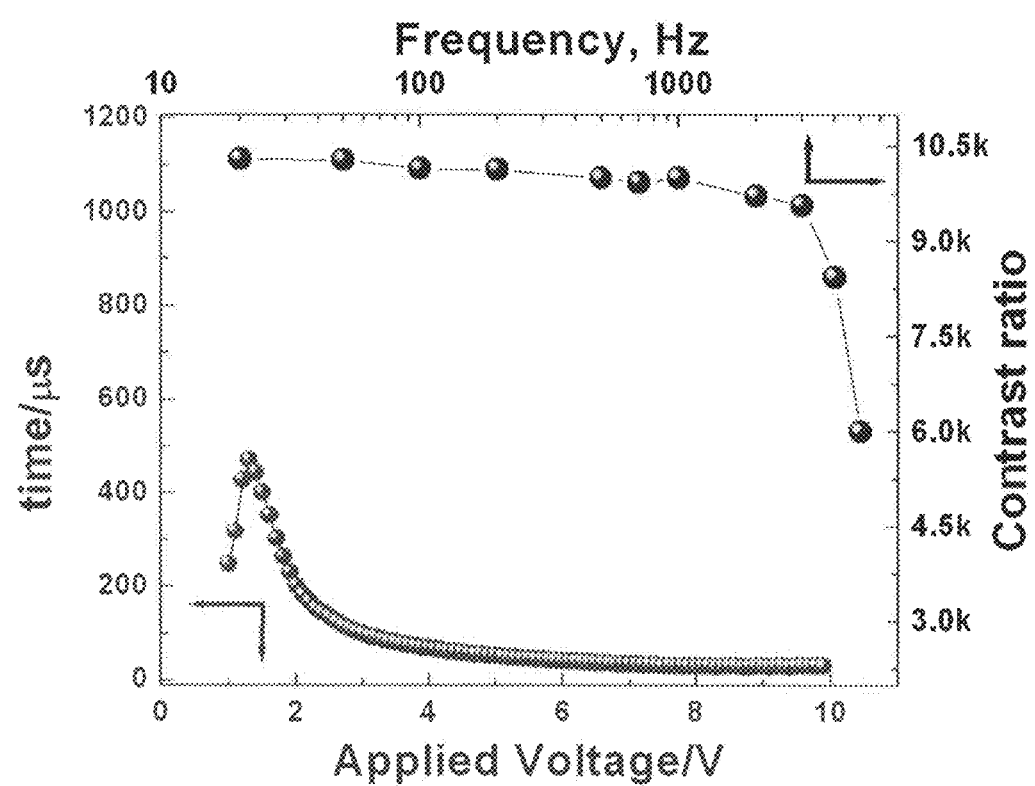
FIG. 10 is a plot illustrating electro-optical characteristics of an exemplary ESH FLC display cell.

The response times of the ESH FLC display cell, for both the switching ON and switching OFF time, are illustrated in FIG. 10 as a function of applied voltages. Specifically, FIG. 10 illustrates the electro-optical characteristics of an exemplary ESH FLC display cell. The bottom solid circles show the response time as a function of applied driving voltages. The solid circles on the top show optical contrast as a function of applied frame frequencies at a driving voltage of 2 V/μm.

In the example illustrated in FIG. 10, the response time is 30 μs at the applied voltage magnitude of 10 V. It can also be seen that the response time first increases with the applied voltage and shows a maximum, which corresponds to the critical field of helix unwinding. At voltages above the maximum, it decreases at higher electric fields.

As discussed above, FIG. 7 illustrates the dependency of contrast ratios on driving voltage frequencies with respect to an exemplary ESH FLC display cell. An ESH FLC cell with $d>P_0$ provides very high contrast ratio up to very high operating voltage frequency. The contrast for an exemplary ESH FLC display cell is more than 10000:1 up to frequencies of 5 kHz at an operating voltage of 5 V/μm. Further, the exemplary ESH FLC display cell shows high contrast with optically saturated bright and dark states. The optically saturated states, as depicted in FIG. 7, are observed until 1 kHz, 3 kHz and 5 k-Hz at electric fields of 1.5 V, 3 V and 5 V, respectively. The frequency range for the saturated optical states can also be increased by applying higher magnitude for the electric field. Thus, the ESH FLC display cell is characterized by the wide viewing angle, fast response time, high contrast and low driving voltages.

Additionally, as discussed above, FIG. 8 illustrates the luminance angular dependence of the transmittance. FIG. 8 shows that an ESH FLC display achieves a wide viewing angle and transmittance at 70° from the normal position, while the transmittance is 60% of its maximum value at the normal position.

In an exemplary embodiment, a electrically suppressed helix (ESH) ferroelectric liquid crystal (FLC) display cell with fast response includes: a liquid crystal layer, disposed between two transparent substrates, wherein helix pitch of chiral smectic liquid crystals of the liquid crystal layer is less than the thickness of the liquid crystal layer; at least one polarizer; and a voltage source, configured to apply electrical driving voltage pulses to electrodes of the display cell with amplitude greater than a critical voltage for helix unwinding of the chiral smectic liquid crystals.

In a further exemplary embodiment, the substrates comprise transparent glass or plastic.

In a further exemplary embodiment, the substrates are each covered with a conducting layer or conducting polymer.

In a further exemplary embodiment, the ESH FLC display cell further comprises: an alignment layer disposed on at least one of the substrates, wherein the alignment layer is one of the group consisting of: a photo-alignment layer, a rubbed polyimide layer, and an alignment layer formed by oblique evaporation or ion beam deposition.

In a further exemplary embodiment, anchoring energy of the alignment layer is comparable to and not larger than elastic energy of the helix of the liquid crystal layer, providing a two-domain alignment for the liquid crystal layer. In an exemplary implementation, the anchoring energy of the alignment layer may be half or three quarters relative to the elastic energy of the FLCs, but it will be appreciated that different relationships may be suitable for different FLC materials.

Figure 11:
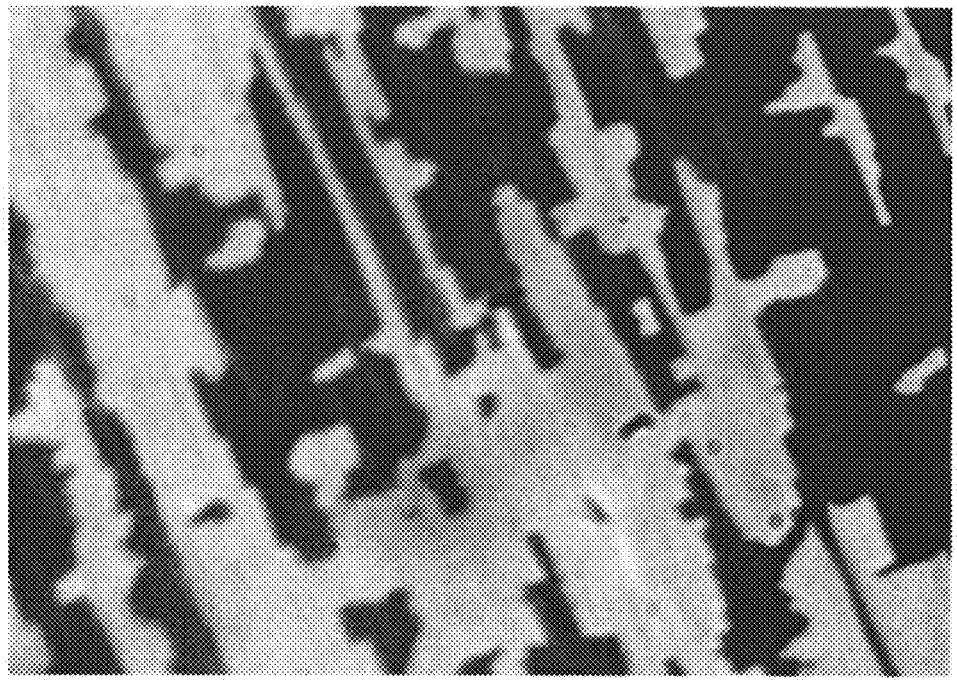
FIG. 11 is a grayscale reproduction of an optical microphotograph depicting an ESH FLC display cell having two domains in the absence of the electric field.

FIG. 11 is a grayscale reproduction of an optical microphotograph depicting an ESH FLC display cell having two domains in the absence of the electric field. The two domains appear in the absence of the electric field because the elastic energy of the helix is balanced by the anchoring energy of the alignment layer.

Figure 12:
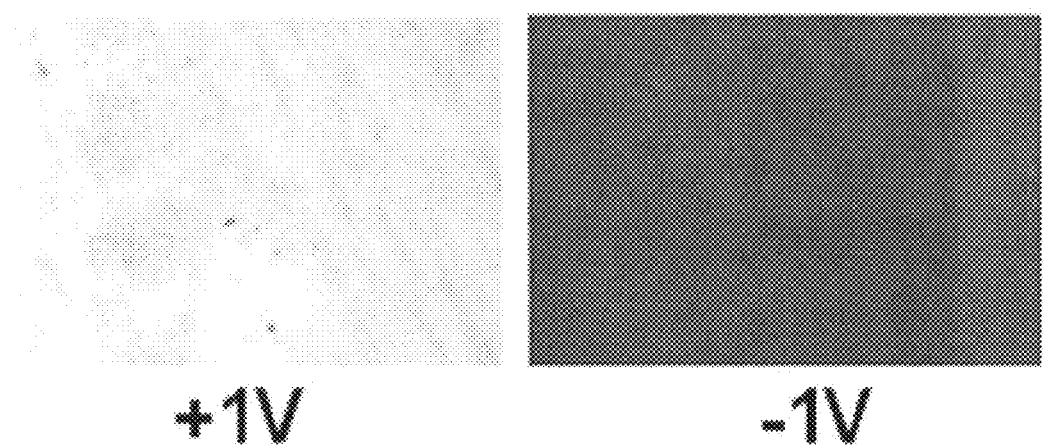
FIG. 12 is a grayscale reproduction of optical microphotographs of an ESH FLC display cell with an applied electric field greater than the critical field for helix unwinding showing bright (left image) and dark (right image) states at +1V and −1V respectively.

FIG. 12 is a grayscale reproduction of optical microphotographs of an ESH FLC display cell with an applied electric field greater than the critical field for helix unwinding showing bright (left image) and dark (right image) states at +1V and −1V respectively. When the applied electric field is higher than the critical field of the helix unwinding, then only the bright or dark state will appear (based on the polarity of the applied voltage).

In a further exemplary embodiment, and as can be seen in FIGS. 11 and 12, the liquid crystal layer has a steady state corresponding to a two-domain alignment in the absence of applied voltage, wherein the principal optical axes of the two domains are deployed at an angle relative to each other; and under an applied driving voltage with amplitude greater than the critical voltage for helix unwinding, one of the two domains is transformed into the other or vice versa based on the polarity of the applied voltage, so as to provide a defect-free layer of chiral smectic liquid crystal. The peak illustrated in the FIG. 10 corresponds to the critical applied voltage (voltages above the critical applied voltage cause only a uniform state to exist).

In a further exemplary embodiment, the chiral smectic liquid crystal layer is a ferroelectric liquid crystal layer of chiral smectic C* phase.

In a further exemplary embodiment, the ESH FLC display cell comprises two polarizers, wherein the two polarizers are crossed.

In a further exemplary embodiment, the ESH FLC display cell is reflective and comprises only one polarizer.

In a further exemplary embodiment, the ESH FLC display cell is configured to manifest an electro-optical modulation with saturated bright and dark states up to an applied voltage frequency of approximately 5 kHz at an electric field of approximately 5 V/μm.

In a further exemplary embodiment, the driving voltage is provided via active addressing, passive addressing or direct addressing of one or more pixels corresponding to the ESH FLC display cell.

In a further exemplary embodiment, the ESH FLC display cell is configured to provide grayscale via pulse width modulation or multiple pulse modulation of the driving voltage.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrically suppressed helix (ESH) ferroelectric liquid crystal (FLC) display cell with fast response, comprising:
   a ferroelectric liquid crystal layer, disposed between two transparent substrates, wherein helix pitch of ferroelectric liquid crystals of the ferroelectric liquid crystal layer is less than the thickness of the ferroelectric liquid crystal layer;
   an alignment layer disposed on one of the two transparent substrates;
   at least one polarizer; and
   a voltage source, configured to apply a driving voltage to electrodes of the ESH FLC display cell with amplitude greater than a critical voltage for helix unwinding of the ferroelectric liquid crystals, causing the ESH FLC display cell, based on the polarity of the driving voltage, to enter either an ESH electro-optical mode corresponding to a bright state or an ESH electro-optical mode corresponding to a dark state, wherein the ESH electro-optical mode corresponding to the bright state corresponds to a first principal optical axis orientation and the ESH electro-optical mode corresponding to the dark state corresponds to a second principal optical axis orientation;
   wherein application of the driving voltage to the electrodes of the ESH FLC display cell utilizes a pulse width modulation driving scheme to generate gray levels for the ESH FLC display cell based on variation in time spent by the ESH FLC display cell in the ESH electro-optical mode corresponding to the bright state relative to time spent by the ESH FLC display cell in the ESH electro-optical mode corresponding to the dark state; and
   wherein in the absence of a driving voltage being applied to the electrodes of the ESH FLC display cell, the ESH FLC display cell is in a steady state having two domains corresponding respectively to the first principal optical axis orientation and the second principal optical axis orientation.

2. The ESH FLC display cell according to claim 1, wherein the two transparent substrates comprise transparent glass or plastic.

3. The ESH FLC display cell according to claim 2, wherein the two transparent substrates are each covered with a conducting layer or conducting polymer so as to provide the electrodes of the ESH FLC display cell.

4. The ESH FLC display cell according to claim 1, wherein the alignment layer is one of the group consisting of: a photo-alignment layer, a rubbed polyimide layer, and an alignment layer formed by oblique evaporation or ion beam deposition.

5. The ESH FLC display cell according to claim 1, wherein, under an applied driving voltage with amplitude greater than the critical voltage for helix unwinding, one of the two domains of the steady state is transformed into the other or vice versa based on the polarity of the applied voltage.

6. The ESH FLC display cell according to claim 1, wherein the ferroelectric liquid crystal layer is of chiral smectic C* phase.

7. The ESH FLC display cell according to claim 1, wherein the ESH FLC display cell comprises two polarizers, wherein the two polarizers are crossed.

8. The ESH FLC display cell according to claim 1, wherein the ESH FLC display cell is reflective and comprises only one polarizer.

9. The ESH FLC display cell according to claim 1, wherein the driving voltage is provided via active addressing, passive addressing or direct addressing of one or more pixels corresponding to the ESH FLC display cell.

10. The ESH FLC display cell according to claim 1, wherein the two domains of the steady state of the ESH FLC display cell are based on a balance between an anchoring energy of the alignment layer and an elastic energy of helixes of the ferroelectric liquid crystals.

11. The ESH FLC display cell according to claim 10, wherein the anchoring energy is not larger than the elastic energy.

12. The ESH FLC display cell according to claim 10, wherein the anchoring energy is approximately one-half to three-quarters of the elastic energy.

13. The ESH FLC display cell according to claim 1, wherein the ESH FLC display cell is configured to provide a contrast ratio greater than or equal to approximately 10000:1 when the driving voltage applied to the electrodes of the ESH FLC display cell has a frequency of 5 kHz.

* * * * *